March 30, 1965 R. W. BOOM ETAL 3,176,195

SUPERCONDUCTING SOLENOID

Filed April 2, 1962

INVENTORS.
Roger W. Boom
Louis D. Roberts
BY
Roland A. Anderson
ATTORNEY.

United States Patent Office 3,176,195

Patented Mar. 30, 1965

3,176,195

SUPERCONDUCTING SOLENOID

Roger W. Boom and Louis D. Roberts, Oak Ridge, Tenn., assignors to the United States of America as represented by the United States Atomic Energy Commission Filed Apr. 2, 1962, Ser. No. 184,613

3 Claims. (Cl. 317—123)

Figures 1, 2:
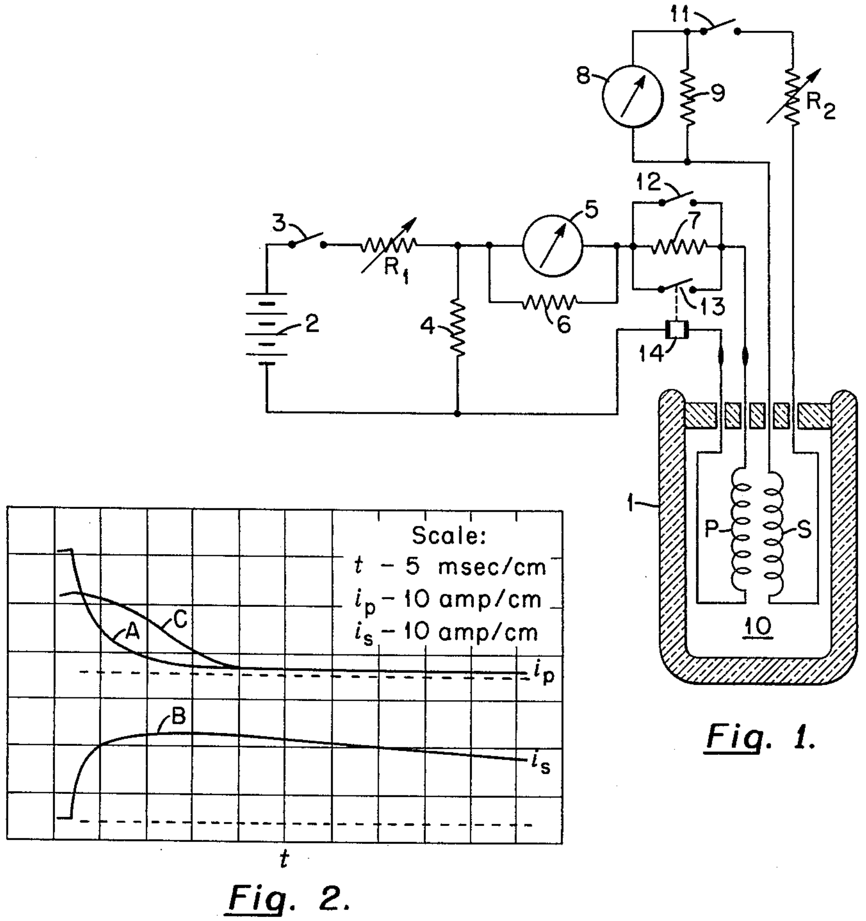

This invention relates to a superconducting solenoid or coil for producing a large magnetic field, the solenoid being provided with means for increasing the current-carrying capacity thereof, for reducing voltage spikes when the current rapidly ceases, and for the safe dissipation of the energy in the coil when such rapid current decreases occur.

Several alloys have been found useful in superconducting solenoids. For a discussion of the properties of such alloys reference is made to an article in "Reviews of Modern Physics," vol. 33, No. 4, pp. 501–509, October 1961, entitled "Superconductivity in High Magnetic Fields at High Current Densities," by J. E. Kunzler. The Zr-Nb alloys were found to provide for the best results, and, for the purposes of the present invention, these Zr-Nb alloys are preferred. It should be understood, however, that the present invention can also be practiced by using other superconducting alloys.

The use of superconducting solenoids for producing very large magnetic fields is very attractive because the capital investment for equipment is reduced by a factor of 10 to 100 when superconductors are used instead of conventional conducting materials. For example, conventional solenoids require large motor-generator sets and cooling facilities in addition to a large quantity of wire for producing large magnetic fields, which is not the case for superconducting solenoids. Also, the size of the superconducting solenoids is so substantially reduced, as compared to conventional solenoids, that many uses are possible with them that formerly were almost prohibitive.

The availability of superconducting solenoids operating at high fields will have a number of practical consequences. For example, they can be used in new communication devices which utilize high magnetic fields, for power generation, for the magnetic containment of energetic plasmas, and for laboratory magnets for a wide variety of uses.

A typical reduced size superconducting solenoid can be illustrated by a solenoid having a 2-inch outside diameter, a 0.5-inch inner diameter and a length of 1.5 inches. This solenoid contains 5530 turns of 0.011-inch 25% Zr-Nb alloy immersed in liquid helium, is powered by a conventional 6-volt automobile battery, and a current of 18.8 amperes flowing through the solenoid will produce a magnetic field of 32,500 gauss over a volume of about 2 cubic centimeters. The stored energy of this solenoid is about 80 joules.

However, the above-described typical solenoid and others like it are subject to significant problems which exist in their operation. It has been repeatedly demonstrated that the superconductor wire of the solenoid will "go normal" (lose its superconducting property) when some critical value of current and/or magnetic field is reached. For the coil described above, the current of 18.8 amperes was the critical current. When the critical value is reached, the transition to normal state occurs very rapidly (a few milliseconds) resulting in rapid dissipation of the stored energy. The solenoid is subjected to mechanical shock, and electrical voltages of several kilovolts may occur with subsequent arcing. These problems are multiplied many fold as the size of the solenoid is increased. For example, it has been calculated that a 20-inch diameter solenoid would have a stored energy up to several megajoules. Rapid dissipation of this energy would certainly evaporate all the liquid helium bath and probably would physically destroy the solenoid itself. Even in case where the energy dissipation is not ordinarily destructive, repeated transitions to the normal state causes failure of the superconducting wire. It should then be obvious that a means of safely dissipating the energy is desirable.

With a knowledge of the above-stated problems, it is a primary object of this invention to provide a superconducting solenoid for producing large magnetic fields and provided with means for safe dissipation of the released energy when the superconductor of the solenoid goes normal.

It is another object of this invention to provide a superconducting solenoid for producing large magnetic fields and provided with means for increasing the current-carrying capacity of the solenoid and thus safely producing an even larger magnetic field.

Figure 3:
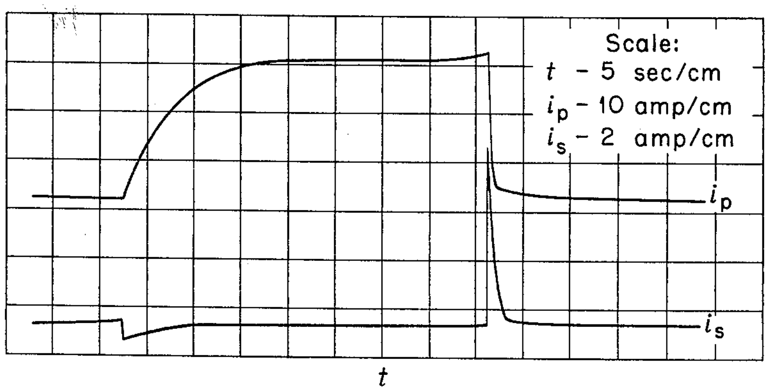

These and other objects and advantages of this invention will become apparent upon a consideration of the following detailed specification when considered with the accompanying drawing wherein:

FIG. 1 is a schematic diagram of the circuit used with the superconducting solenoid of the present invention;

FIG. 2 is a reproduction of oscilloscope traces illustrating the variation of current in the superconducting winding under conditions when the "secondary" winding is shorted and when it is open, and in the secondary winding when it is shorted; and FIG. 3 is a reproduction of an oscilloscope trace illustrating the variation of currents in the windings of the solenoid before, during and after the superconductor goes "normal."

The above objects have been accomplished in the present invention by providing a "secondary" winding of a conducting material in the solenoid disposed so as to be in intimate coupling with at least most of the turns of the superconductor primary winding wire. The secondary winding is normally shorted because the device will operate at higher currents with a shorted secondary. The use of a secondary winding has proven useful in the dissipation of the released energy when the superconducting primary goes normal, and also permits the operation of the device at higher operating currents than is possible without the secondary winding. For larger superconducting solenoids, there is provided an auxiliary high resistance which is switched into the primary circuit at the transition to normal to provide a further means for the dissipation of the released energy.

FIG. 1 illustrates a typical solenoid in which the principles of this invention may be carried out. The solenoid itself may have the following dimensions, for example: 1.5 cm. I.D., 6.3 cm. O.D., 3.9 cm. in length. There are 60 layers of windings containing 2824 turns each of insulated 0.010-inch copper wire in the secondary S, and 0.010-inch 25% Zr-Nb alloy wire in the primary P. The primary and the secondary each has an inductance of 0.13 henry (with the other coil open). During winding, the solenoid was "potted" in an epoxy resin, Stycast 2850-GT, manufactured by Emerson and Cummings. The concentration of zirconium in the above alloy of the superconductor wire can usefully be varied from 25 to 75 percent. The current-carrying capacity of the alloy will reach a maximum in the range of concentration from 25 to 35 percent of the zirconium in the alloy. Other alloys may be used for the superconductor wire, if desired, such as those described in the above-mentioned publication.

The solenoid is immersed in liquid gas, which may be helium, for example, disposed in the compartment 10 of a dewar 1 to provide an operating temperature of 4.2° K., for example. Liquid gases other than helium may be used, if desired, such as liquid hydrogen at operating temperatures below that required for superconductivity of the primary winding. The operating temperature of the liquid gas should be as low as possible for best results, and in any case should be below the transition temperature of the particular alloy used in the superconducting winding. The ends of the coils are brought out of the dewar and connected as shown. The resistance 9, connected across the secondary copper coil S by a switch 11, has a resistance of 0.001 ohm. This resistance 9 is a meter shunt for the meter 8. The resistance of the copper coil S at operating temperature is 0.9 ohm. An adjustable resistor $R_2$ is also connected in the exterior circuit to coil S to dissipate energy exterior to the dewar 1.

A conventional hi-current, 6-volt battery 2 is connected across the superconductor primary coil P through a switch 3, adjustable resistor $R_1$, ammeter 5, manual switch 12, and a relay coil 14. A resistor 7 is connected in shunt with switch 12 and with relay contacts 13 of relay 14. The purpose of resistor 7 will be described below. A 0.001-ohm resistor 6 is connected in shunt across the ammeter 5. The resistor 7 is used for larger solenoids, in a manner to be described, and its value is about 100 ohms, for example. A resistor 4 is connected in shunt across the coil P. Resistor 4 has a value of about 0.011 ohm and is used as an emergency shunt to carry current when the superconductor of the primary coil P goes normal, which occurs when a critical current flows through the coil. The resistor $R_1$ is used to control the current flowing through the superconductor coil P.

In the case of the external circuit for the superconductor coil, a connection between each superconductor lead and its associated copper lead is made using the following joining method. The oxide coating is removed from the surface of the superconductor for about ½ inch from the end thereof. This is then inserted in an axially drilled hole in the copper lead wire and then the copper is caused to be plastically deformed to grip the superconductor.

In a normal testing of the above solenoid, the switch 12 is maintained closed and the current through the superconductor coil P was gradually increased until transition to normal state occurred. This was done with the secondary winding first shorted and then open. Measurement of the current, and occasionally the voltage, of the separate windings were made, and visual observation on a cathode ray tube permitted a detailed study of these parameters during the transition. Photographs were made of the traces on the cathode ray tube for further analysis. The coil P was repeatedly cycled between superconducting and normal states to permit these analyses at different sensitivities.

The data obtained in this study shows that a solenoid having the above construction has many favorable characteristics, some of which are illustrated in FIGS. 2 and 3. In FIG. 2, for example, a comparison of the oscilloscope trace for primary coil current (curve A) shows that when the secondary coil is shorted, the current decreases more rapidly at the transition than when the secondary is open (curve C). This figure also shows the current in the secondary coil (curve B) when shorted, illustrating the transfer of the energy into the secondary coil. The ratio of the power dissipated in each coil is approximately equal to the ratio of the currents. The maximum current attained when the secondary coil was shorted was about 30 amperes, and when it was open, the maximum was about 20 amperes.

FIG. 3 is a reproduction of the oscilloscope trace showing the currents in the primary and secondary coils from the time of energizing the superconductor coil P until after the transition to the normal state. The current induced in the secondary coil again illustrates how the power can be dissipated safely, without destruction of the superconductor coil, when the superconductor goes normal. The heat thus generated in the copper is, in turn, dissipated in the liquid gas and/or the external circuit ($R_2$) connected to the secondary circuit.

It should be noted that the use of a secondary winding permits the superconductor coil to operate at higher currents (30 amperes) to produce a magnetic field of about 20,000 gauss as compared to a coil with twice the number of turns and no secondary coil (18.8 amperes). Also, the use of a shorted secondary coil provides a safe and efficient means for the dissipation of the released energy when the superconductor primary coil goes normal.

The above-described solenoid uses a 1:1 ratio of wire windings for the primary and secondary coils and wires of equal diameter. The solenoid is not necessarily limited to these values of ratio and wire size. For example, more or less copper may be used to optimize the energy dissipation and the time constant of the circuit for a given solenoid. The secondary winding must, however, be uniformly distributed throughout the primary winding to be most effective. In addition, passages through the solenoid may be provided to permit access of liquid helium (or some other coolant). Such a provision would increase the efficiency of heat dissipation from the copper winding.

In the specific, small solenoid described above, the resistor 7 and relay coil 14 are not necessary in the operation of this solenoid and could be omitted, if desired, and the switch 12 could be a direct connection to the primary coil P. However, for larger solenoids, for example 20-inch diameter or larger, where the number of turns and layers of windings are correspondingly greater, then the resistance of the secondary is correspondingly greater and at the transition to normal of the superconducting primary, the energy stored in the primary will not be transferred to the secondary until the resistance of the primary equals that of the secondary. If the resistance of the secondary is relatively large, for example about 60 ohms, then there is a possibility of severe damage to the primary winding before the stored energy is transferred to the secondary from the primary. Under these conditions of operation it would be desirable to provide some additional means for dissipation of the stored energy in the primary at the transition to normal. This may be provided for by the resistor 7.

An example of the operation of the device of FIG. 1 for a relatively large solenoid will now be given. In such a solenoid, the resistance of the secondary coil may be about 60 ohms, for example. At start-up, in the operation of such a solenoid, switches 3, 11, and 12 are closed. When an operating current is flowing through the primary winding P, that is, the primary winding is superconducting, the relay 14 operates to close its contacts 13, thereby shunting the resistor 7. The value of resistor 7 may be about 100 ohms, for example. This resistor 7 may be made smaller or larger depending upon the value of the resistance of the secondary winding S. After relay contacts 13 are closed, then manual switch 12 is opened and maintained open. The circuit is now in condition to respond to a transition to normal of the superconducting winding P. At the transition to normal, the current through relay 14 will drop. Relay 14 will then not have sufficient current flowing therethrough to maintain its relay contacts 13 closed, and resistance 7 is then switched into series with the primary winding P and will serve as a means, along with the secondary winding S, of dissipation of the energy stored in the primary winding. The relay 14 with its contacts 13 is a conventional quick-release type and is provided with conventional means for protecting the contacts against any severe arcing that may occur during opening thereof.

It should be apparent from the above descriptions that the system of FIG. 1 may be used for small solenoids (switch 12 normally held closed), or for larger solenoids (switch 12 initially closed, then opened when superconducting current is flowing). For small solenoids the secondary coil is sufficient for providing the desired protection. For larger solenoids the secondary coil plus the resistance 7, which is switched in at the transition to normal, provide for the desired protection of the solenoid.

This invention has been described by way of illustration rather than limitation and it should be apparent that this invention is equally applicable in fields other than those described.

What is claimed is:

1. An improved superconducting solenoid for producing a strong magnetic field up to 20,000 gauss, comprising a dewar, a liquid gas disposed in said dewar, a superconducting primary winding, a high resistance secondary copper winding in intimate coupling with said primary winding, said primary and secondary windings being immersed in said liquid gas within said dewar, said liquid gas providing an operating temperature below the transition temperature of said superconducting primary winding, an external, adjustable load circuit being connected across said secondary winding, an external, low voltage D.C. source connected across said primary winding to supply operating current thereto, an adjustable resistor connected in said low voltage circuit for adjusting the value of current supplied to said primary winding, said primary winding being superconducting up to a critical value of supply current thereto, said primary winding going normal when said critical value of current has been reached or exceeded, and an emergency shunt resistor connected across said battery and said primary winding to carry the current in the event said primary winding goes normal (that is, loses its superconducting property), whereby said solenoid operates to provide a strong magnetic field up to said critical value of said supply current, said secondary winding serving as a means for dissipating the released energy from said primary winding at its transition to normal, thereby protecting said primary winding against damaging voltage surges.

2. The superconducting solenoid set forth in claim 1, wherein a load resistor is connected in said external low voltage circuit in series with said primary winding, circuit means connected across said load resistor for shunting said load resistor during normal operation of said solenoid, and means connected in said low voltage circuit and responsive to a transition to normal of said primary winding to remove said shunt across said load resistor, whereby said load resistor serves as an additional means for dissipation of the released energy from said primary winding at its transition to normal.

3. The superconducting solenoid set forth in claim 2, wherein said means connected in said low voltage circuit for removing said load resistor shunt is a relay provided with a pair of switching contacts connected in said shunt circuit means.

References Cited by the Examiner

UNITED STATES PATENTS

| | | | |
|---|---|---|---|
| 1,792,512 | 2/31 | Siegmund | 336—73 |
| 2,596,606 | 5/52 | Scherer | 317—16 |
| 2,987,631 | 6/61 | Park | 307—88.5 |
| 3,082,408 | 3/63 | Garwin | 307—88.5 X |
| 3,088,077 | 4/63 | Schmitt et al. | 336—30 |

SAMUEL BERNSTEIN, *Primary Examiner.*

LLOYD McCOLLUM, *Examiner.*